US008854951B2

(12) United States Patent
Godfrey et al.

(10) Patent No.: US 8,854,951 B2
(45) Date of Patent: Oct. 7, 2014

(54) DYNAMICALLY UPDATING ROUTING INFORMATION WHILE AVOIDING DEADLOCKS AND PRESERVING PACKET ORDER AFTER A LINK ERROR

(75) Inventors: Aaron F. Godfrey, Eagan, MN (US); Christopher B. Johns, Edina, MN (US)

(73) Assignee: Cray Inc., Seattle, WA (US)

( * ) Notice: Subject to any disclaimer, the term of this patent is extended or adjusted under 35 U.S.C. 154(b) by 394 days.

(21) Appl. No.: 13/104,778

(22) Filed: May 10, 2011

(65) Prior Publication Data

US 2012/0287777 A1    Nov. 15, 2012

(51) Int. Cl.
 G01R 31/08    (2006.01)
 H04L 12/757    (2013.01)
 H04L 12/24    (2006.01)

(52) U.S. Cl.
 CPC .......... *H04L 41/0659* (2013.01); *H04L 45/023* (2013.01)
 USPC .......................................... 370/218; 370/410

(58) Field of Classification Search
 CPC .............................. H04L 12/26; H04L 12/56
 USPC .......... 370/256, 286, 351, 535, 392; 709/224, 709/205, 245, 230; 719/315–318
 See application file for complete search history.

(56) References Cited

U.S. PATENT DOCUMENTS

| | | | |
|---|---|---|---|
| 5,533,198 A | 7/1996 | Thorson | |
| 7,283,463 B2 | 10/2007 | Miller et al. | |
| 7,565,566 B2 | 7/2009 | Davies et al. | |
| 7,984,453 B2 | 7/2011 | Alverson et al. | |
| 8,572,624 B2 | 10/2013 | Heller et al. | |
| 8,675,639 B2 | 3/2014 | Berman | |
| 2005/0044268 A1* | 2/2005 | Johnston-Watt et al. | 709/238 |
| 2008/0134213 A1* | 6/2008 | Alverson et al. | 719/318 |
| 2009/0006829 A1* | 1/2009 | Cai et al. | 713/1 |
| 2009/0264125 A1 | 10/2009 | Rofougaran et al. | |
| 2011/0294472 A1 | 12/2011 | Bramwell et al. | |
| 2013/0047034 A1 | 2/2013 | Salomon et al. | |

OTHER PUBLICATIONS

U.S. Appl. No. 13/104,799, filed May 10, 2011, Godfrey et al.
Alverson, R., Roweth., and Kaplan, L., "The Gemini System Interconnect," 2010 IEEE Symposium on High Performance Interconnects, pp. 83-87, Mountain View, CA, Aug. 18-20, 2010.
Non-Final Office Action for U.S. Appl. No. 13/104,799, Mail Date Jun. 20, 2013, 32 pages.

* cited by examiner

*Primary Examiner* — Ricky Ngo
*Assistant Examiner* — Iqbal Zaidi
(74) *Attorney, Agent, or Firm* — Perkins Coie LLP

(57) ABSTRACT

A system for allowing dynamic changing of routing information of a network interconnect while avoiding deadlocks and preserving packet ordering. A network resiliency system detects when an error in the network interconnect occurs and dynamically generates new routing information for the routers that factors in the detected error. The network resiliency system then generates new routing information that factors in the failure. The network resiliency system then directs the network interconnect to enter a quiescent state in which no packets are transiting through the network interconnect. After the network interconnect enters the quiescent state, the network resiliency system directs the loading of the new routing information into the routing tables of the network interconnect and then directs the network interconnect to start injecting request packets into the network interconnect.

16 Claims, 12 Drawing Sheets

US 8,854,951 B2

DYNAMICALLY UPDATING ROUTING INFORMATION WHILE AVOIDING DEADLOCKS AND PRESERVING PACKET ORDER AFTER A LINK ERROR

STATEMENT REGARDING FEDERALLY SPONSORED RESEARCH

This invention was made with government support under (identify the contract) awarded by the Defense Advanced Research Projects Agency (DARPA). The government has certain rights in the invention.

CROSS-REFERENCE TO RELATED APPLICATIONS

This application is related to U.S. patent application Ser. No. 13/104,799 entitled DYNAMICALLY UPDATING ROUTING INFORMATION WHILE AVOIDING DEADLOCKS AND PRESERVING PACKET ORDER AFTER A CONFIGURATION CHANGE, filed concurrently herewith and is incorporated herein by reference.

BACKGROUND

Massively parallel processing ("MPP") systems may have tens and even hundreds of thousands of nodes connected via a communications mechanism. Each node may include one or more processors (e.g., an AMD Opteron processor), memory (e.g., between 1-32 gigabytes), and a communications interface (e.g., HyperTransport technology) connected via a network interface controller ("NIC") to a router with router ports. Each router may be connected via its router ports to some number of other routers and then to other nodes to form a routing topology (e.g., torus, hypercube, and fat tree) that is the primary system network interconnect. Each router may include routing tables specifying how to route incoming packets from a source node to a destination node. The nodes may be organized into modules (e.g., a board) with a certain number (e.g., 4) of nodes and routers each, and the modules may be organized into cabinets with multiple (e.g., 24) modules in each cabinet. Such systems may be considered scalable when an increase in the number of nodes results in a proportional increase in their computational capacity. An example network interconnect for an MPP system is described in Alverson, R., Roweth, D., and Kaplan, L., "The Gemini System Interconnect," 2010 IEEE Annual Symposium on High Performance Interconnects, pp. 83-87, Mountain View, Calif., Aug. 18-20, 2010, which is hereby incorporated by reference.

The nodes of an MPP system may be designated as service nodes or compute nodes. Compute nodes are primarily used to perform computations. A service node may be dedicated to providing operating system and programming environment services (e.g., file system services, external Input/Output ("I/O"), compilation, editing, etc.) to application programs executing on the compute nodes and to users logged in to the service nodes. The operating system services may include I/O services (e.g., access to mass storage), processor allocation services, program launch services, log in capabilities, and so on. The service nodes and compute nodes may employ different operating systems that are customized to support the processing performed by the node.

An MPP system may include a supervisory system comprising a hierarchy of controllers for monitoring components of the MPP system as described in U.S. Patent Application No. 2008/0134213, entitled "Event Notifications Relating to System Failures in Scalable Systems," filed on Sep. 18, 2007, which is hereby incorporated by reference. At the lowest level of the hierarchy, the supervisory system may include a controller associated with each node that is implemented as software that may execute on the node or on special-purpose controller hardware. At the next lowest level of the hierarchy, the supervisory system may include a controller for each module that may be implemented as software that executes on special-purpose controller hardware. At the next lowest level of the hierarchy, the supervisory system may include a controller for each cabinet that also may be implemented in software that executes on special-purpose controller hardware. The supervisory system may optionally include other levels of controllers for groups of cabinets. At the top of the hierarchy is a controller designated as the supervisory controller or system management workstation, which provides a view of the overall status of the components of the multiprocessor system. The hierarchy of controllers forms a tree organization with the supervisory controller being the root and the controllers of the nodes being the leaf controllers. Each controller communicates between its parent and child controller using a supervisory communication network that is independent of (or out of band from) the primary system network interconnect. For example, the supervisory communication network may be a high-speed Ethernet network.

The controllers monitor the status of the nodes, network interface controllers, and routers. A leaf controller (or node controller) may monitor the status of the hardware components of the node and the system services executing on the node. The next higher level controller (module controller or L0 controller) may monitor the status of the leaf controllers of the nodes of the module, power to the module, and so on. The next higher level controller (cabinet controller or L1 controller) may monitor the status of the next lower level controllers, power to the cabinet, cooling of the cabinet, and so on.

FIG. 1 is a block diagram that illustrates an example controller hierarchy of a supervisory system. The controller hierarchy 100 includes a root or supervisory controller 101. The supervisory controller (also referred to as a system management workstation) is the parent controller for cabinet controllers 104. A cabinet physically contains the modules. Each cabinet controller is a parent controller of module controllers 105 within the cabinet. A module is a physical grouping of a number (e.g., four) of nodes. Each module controller is a parent controller of node controllers 106 on a module. The lines between the controllers represent the logical communications path between the controllers, which may be implemented as a supervisory communications network that is out of band from the primary system network interconnect, which is not shown in FIG. 1.

FIG. 2 is a block diagram that illustrates an example network interface and routing device of a network interconnect. A network device 200 includes two network interface controllers ("NICs") 210 and 211. Each network interface controller is connected via a HyperTransport connection 220 or a HyperTransport connection 221 to a node (not shown). The network interface controllers are connected to a router 230 via a netlink 260. The network device also includes a supervisory component 240 with a connection to a local controller 250. The packets from the network interface controllers are routed via the netlink to the router over a router input selected for load balancing purposes. The router routes the packets to one of 40 network connections. Each packet may comprise a variable number of fixed-sized flow control units, referred to as "flits." Requests for services are generally sent as request packets, and generally each request packet has a corresponding response or reply packet indicating the response to the corresponding request.

FIG. 3 is a block diagram that illustrates the connections of an example network device. The network device 300 includes 40 router ports 301 for connection to other routers in the network interconnect. The network device includes four links of four ports each in the x and z directions and two links of four ports each in the y direction.

FIG. 4 is a block diagram that illustrates the layout of an example router. The router 400 comprises 48 tiles arranged into a matrix of six rows and eight columns. The router provides 40 connections to the network and 8 connections to the network interface controllers via the network link. Each tile 410 includes an input buffer 411, routing logic 412, a row bus 413, row buffers 414, an 8×6 switch 415, a column bus 416, output buffers 417, and an output multiplexor 418. The packets are received at a tile via the router port connected to the input buffer and processed on a flit-by-flit basis by the routing logic. During each cycle of the tile, the routing logic retrieves a flit (if available) from the input buffer and routes the flit via a line of the row bus to one of the row buffers of a tile in the same row. If that row buffer is full, then the routing logic leaves the flit in the input buffer and repeats the process during the next cycle. At each cycle, flits in the row buffers are routed via the 8×6 switch to an output buffer in a tile in the same column. During each cycle, the output logic sends a flit from an output buffer to the router port associated with that tile. The tiles of the routers and the network interface controllers are referred to as "network components."

The routing logic of the tiles routes the flits based on a routing table for each of the tiles. Each routing table contains 32 entries, and each entry includes a match and a mask. The routing logic at an input port of a tile applies the match of each entry in sequence to each packet to find the first matching entry. The routing logic then routes the packet (on a flit-by-flit basis) to an output port identified by the mask of that matching entry. Other router architectures may have one or more routing tables per router and may not be tile-based. Each routing table may also have any number of entries (e.g., 64 or 128).

The routing tables of a network interconnect are typically initialized to avoid deadlocks and to ensure proper ordering of packets. A deadlock may occur, for example, when routers along a routing path cannot send a flit because other routers along the routing path are full and cannot send a flit because other routers are full. There are well-known routing algorithms for avoiding deadlocks such as that described in U.S. Pat. No. 5,533,198, entitled "Direction Order Priority Routing of Packets Between Nodes in a Networked System." When routed through a network, certain types of packets need to have their order of delivery guaranteed. For example, a program may store data in a remote memory location and later load that data from that same remote memory location. To store the data, the processor executing the program sends a store request via the network to the remote memory location. To load the data, the processor sends a load request via the network to the remote memory location. If the requests were to travel on different routes through the network, it might be possible (e.g., depending on network congestion) for the load request to arrive at the remote memory location before the store request. In such a case, the load request would load the old value from the remote memory location. Networks employ various techniques to ensure that "ordered packets" are received in the same order as they were sent. For example, a network may ensure that ordered packets each travel through the same route. Unordered packets, in contrast, do not depend on their ordering for proper functioning. For example, two load requests to the same memory location will function properly regardless of which is received first (assuming no intervening store request).

Links of a network can fail for various reasons. For example, a link may simply break or become disconnected at one end, or the router to which a link is connected may lose power. Whenever a link fails, the network is no longer fully connected. In such a case, ordered packets may not be able to travel on the same route. Various techniques have been used to recover from failed links. One technique terminates all jobs executing on each node, then restarts the system with new routes that avoid failed links and restarts the terminated job, which may continue from a checkpoint. Another technique may have redundant links, and when a link fails, the technique routes packets onto the redundant link. However, if the redundant link also fails, then another approach needs to be used such as restarting the system.

DETAILED DESCRIPTION

Figure 1:
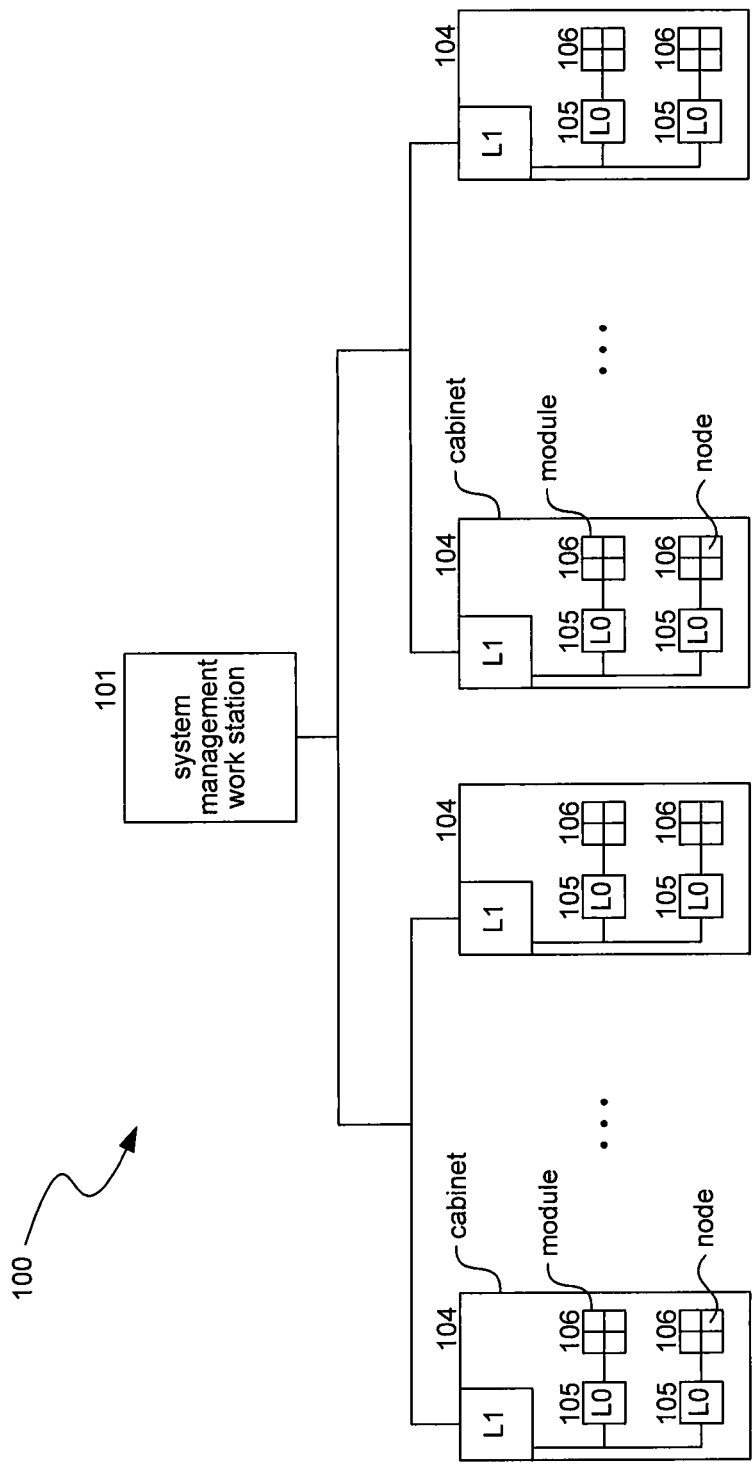
FIG. 1 is a block diagram that illustrates a controller hierarchy of the supervisory system in some embodiments.
Figure 2:
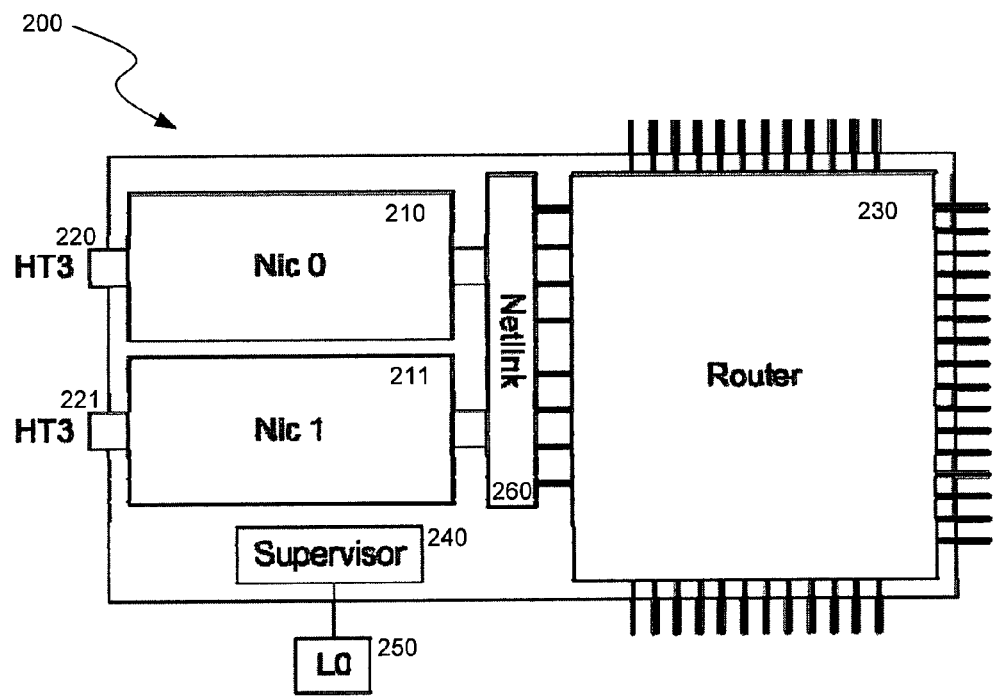
FIG. 2 is a block diagram that illustrates an example network interface and routing device of a network interconnect.
Figure 3:
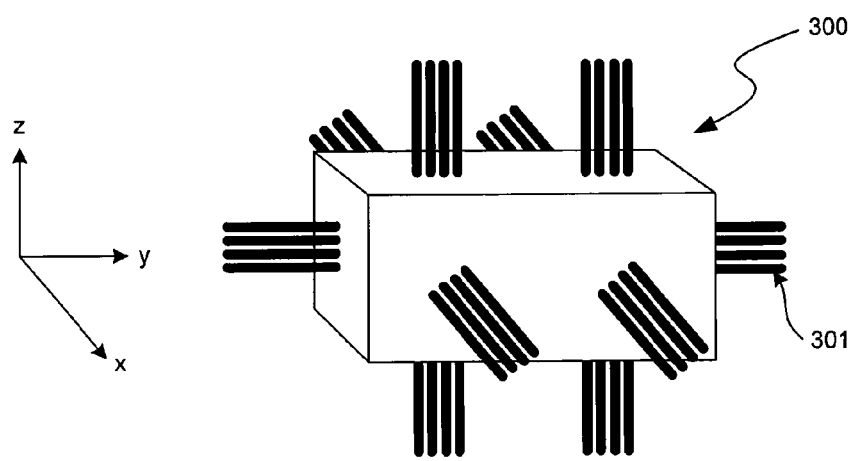
FIG. 3 is a block diagram that illustrates the connections of an example network routing device.
Figure 4:
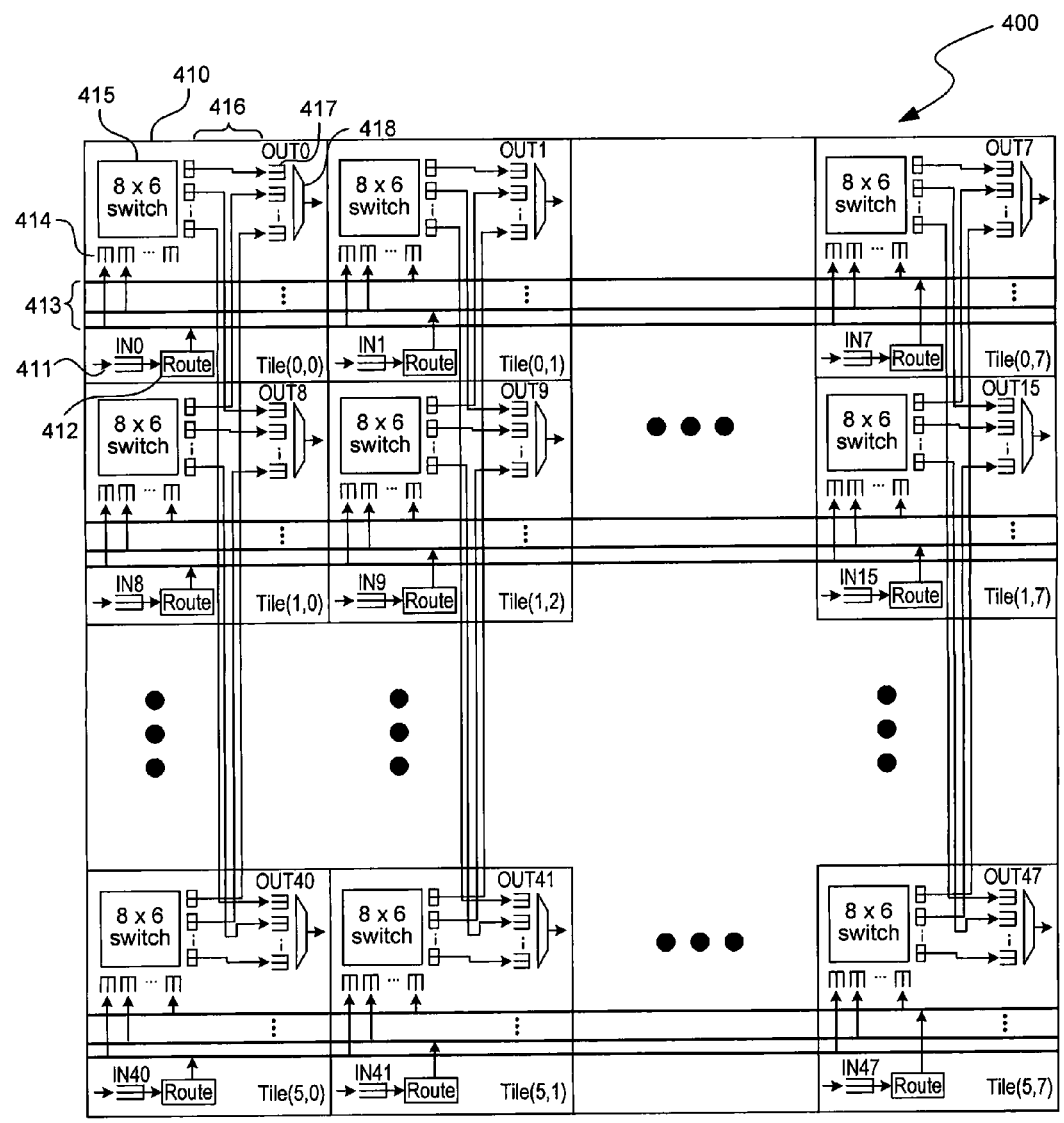
FIG. 4 is a block diagram that illustrates the layout of an example router.

A method, a system, and a computer-readable storage device are provided to allow dynamic changing of routing information of a network interconnect while avoiding deadlocks and preserving packet ordering. In some embodiments, a network resiliency system detects when an error in the network interconnect occurs and dynamically generates new routing information for the routers that factors in the detected error. For example, if a link is reported as having failed, the new routing information identifies routes that bypass the failed link. The network resiliency system may use a conventional routing algorithm that avoids deadlocks to generate the new routing information. Because the network interconnect may have thousands of routers, the loading of the new routing information into the routers may happen over a period of time. During this period, the routing information of the various routers may be in an inconsistent state because some routers have new routing information while other routers still have the old routing information. Although the old routing information and the new routing information may each separately avoid deadlocks, the mixture of old and new routing information may not avoid such deadlocks. Moreover, during this period, the ordering of ordered packets may not be guaranteed because of the mixture of old and new routing information.

Although conventional techniques may avoid such deadlocks and preserve packet ordering by reinitializing the entire network including processors and the network interconnect, the network resiliency system does so without having to reinitialize the entire network. When the network resiliency system receives an indication of a failure in the network interconnect, the network resiliency system generates new routing information that factors in the failure. The network resiliency system then directs the network interconnect to enter a quiescent state in which no packets are transiting through the network interconnect. To achieve this quiescent state, the network resiliency system suppresses the injection of request packets into the network interconnect. Although the injection of the request packets is suppressed, the network resiliency system allows response packets to be injected into the network interconnect and allows those request packets that have already been injected (are in transit) to continue to their destination. The network resiliency system thus allows already-injected request packets and their response packets to be delivered. Once all the request packets and their responses are delivered, the network interconnect is in a quiescent state. After the network interconnect enters the quiescent state, the network resiliency system directs the loading of the new routing information into the routing tables of the network interconnect. After the loading of the new routing information has been confirmed (i.e., the routing information is in a consistent state), the network resiliency system directs the network interconnect to restart injecting request packets into the network interconnect. These injected request packets will be routed according to be new routing information only, thus avoiding deadlocks and preserving packet ordering.

In some embodiments, the network resiliency system may be implemented primarily using a supervisory system that includes a supervisory controller at the highest level of a supervisory system hierarchy and local controllers near or at the lowest level of the hierarchy. When a network interconnect error is detected by a controller, the controller routes an indication of the error up the hierarchy to the supervisory controller. The supervisory controller then directs the generating of the new routing information that factors in the error. The supervisory controller then notifies each local controller to suppress the injecting of request packets into the network interconnect. The local controllers may set a flag on the network interface controllers to effect this suppressing. When this flag is set, the network interface controllers buffer new request packets received from a processor without injecting them into the network interconnect, but allow response packets to be injected into the network interconnect. When the buffer is full of request packets, the programs executing on the processor will eventually stall waiting for receipt of the response packet corresponding to a request packet that has not yet been injected into the network interconnect. Because the network interconnect may not have an effective way of signaling when no packets are currently in transit, the network resiliency system waits for confirmation that each local controller has suppressed the injecting of request packets into the network interconnect and then starts a timer to allow the already-injected request packets and any response packets to complete their routes through the network interconnect. The network resiliency system may set the timer based on the maximum anticipated time it would take for a request packet and its response packet to travel through the interconnect network. When the timer expires, the network resiliency system may assume that the network interconnect is in a quiescent state.

In some embodiments, when the network interconnect enters the quiescent state, the network resiliency system of the supervisory controller requests the local controllers to have the new routing information loaded into the routers. Because the request and the subsequent loading may take a variable amount of time, the network resiliency system executing on the supervisory controller waits until each local controller responds that the routing information has been successfully loaded. At that point, the network resiliency system at the supervisory controller requests the local controllers to start allowing request packets to be injected into the network interconnect. The local controllers then reset the flag to allow the injection of request packets. Any programs waiting for the network interface controller buffer to no longer be full will detect that the buffers are no longer full and start sending requests. Any programs, to the extent that they do not send requests, would continue their execution during the process of generating the new routing information, entering the quiescent state, and loading the new routing information. In general, the network resiliency system seeks to avoid the termination of processes created by the operating system while the routing information is being dynamically created and loaded.

In some embodiments, the network resiliency system may generate new routing information in a distributed manner. When requested by the supervisory controller, each local controller may generate routing information for the routers controlled by that local controller. The local controllers may access a central configuration store (e.g., database) to access the current or anticipated configuration for the network interconnect. Each local controller stores its routing information locally while waiting for the supervisory controller to request loading or installing of the routing information in the routers. Alternatively, the network resiliency system may rely on a computing system other than the hierarchy of controllers to generate the new routing information and store the new routing information in a central store. In such a case, each local controller may retrieve its new routing information from the central store when requested by a supervisory controller to load routing information into the routers.

In some embodiments, the network resiliency system allows for planned changing of the configuration of the network interconnect. For example, the configuration may be changed to add additional routers and links, to upgrade existing routers and links, and to remove routers and links. The network resiliency system allows for the changes in configuration to be accomplished dynamically in much the same way as when a network interconnect error is detected as described above. The network resiliency system executing at the supervisory controller first receives a notification that a change has been made (e.g., add a new blade) or that a change is to be made (e.g., remove a blade) to the configuration of the network interconnect. If a blade is to be removed, the programs executing on the nodes of the blade should be stopped prior to receipt of the notification. Upon receiving such a notification, the network resiliency system updates the central configuration store with the new configuration of the network interconnect and then requests that new routing information be generated based on the configuration. The network resiliency system then requests that the network interconnect enter a quiescent state. After the network interconnect enters the quiescent state, the network resiliency system then directs the loading of the new routing information into the routers and then directs the network interconnect to exit the quiescent state by starting to inject request packages into the network interconnect. If a blade is to be removed, a person can then physically remove the blade. If a blade was added, a person can direct the booting of the operating system on the nodes of the added blade. In this way, the configuration of the network interconnect can be dynamically changed without having to bring down the entire network interconnect and its connected nodes.

Figure 5:
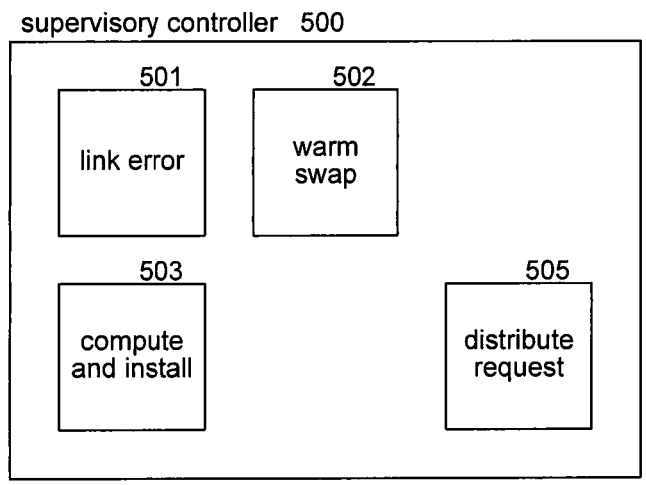
FIG. 5 is a block diagram illustrating components of a supervisory controller of the network resiliency system in some embodiments.

FIG. 5 is a block diagram illustrating components of a supervisory controller of the network resiliency system in some embodiments. In some embodiments the supervisory controller 500 includes a link error component 501, a warm swap component 502, a compute and install component 503, and a distribute request component 505. The link error component receives an indication of an error in the network interconnect, updates the configuration of the network interconnect in the central store, and directs the routing information to be generated and installed. The warm swap component controls a planned change in configuration and the corresponding generation and installation of the new routing information. The compute and install component generates the new routing information based on the changed configuration and directs the network interconnect to install the new routing information. The distribute request component distributes requests of the supervisory controller to the local controllers and tracks the responses.

Figure 6:
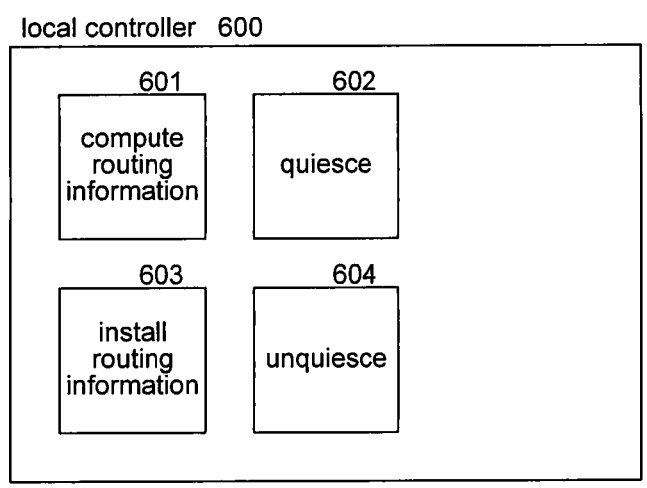
FIG. 6 is a block diagram that illustrates the components of a local controller of the network resiliency system in some embodiments.

FIG. 6 is a block diagram that illustrates the components of a local controller of the network resiliency system in some embodiments. In some embodiments, the local controller 600 includes a compute routing information component 601, a quiesce component 602, an install routing information component 603, and an unquiesce component 604. The compute routing information component accesses the configuration information of the central store and generates routing information for the local controller. The quiesce component directs the network interface controllers to suppress injecting request packets into the network interconnect. Alternatively, the quiesce component may direct programs executing on a processor to stop sending request packets to the network interconnect. The install routing information component directs the loading of the new routing information into the routing tables of the routers. The unquiesce component directs the network interface controllers to resume injecting request packets into the network interconnect.

The devices on which the network resiliency system may be implemented may include a central processing unit and memory and may include, particularly in the case of the system management workstation, input devices (e.g., keyboard and pointing devices), output devices (e.g., display devices), and storage devices (e.g., disk drives). Computer-readable media includes computer-readable storage media and data transmission media. The computer-readable storage media includes memory and other storage devices that may have recorded upon or may be encoded with computer-executable instructions or logic that implement the network resiliency system. The data transmission media is media for transmitting data using signals or carrier waves (e.g., electromagnetism) via a wire or wireless connection. Various functions of the network resiliency system may also be implemented on devices using discrete logic or logic embedded as an application-specific integrated circuit. The devices on which the network resiliency system is implemented are computing devices.

The network resiliency system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 7:
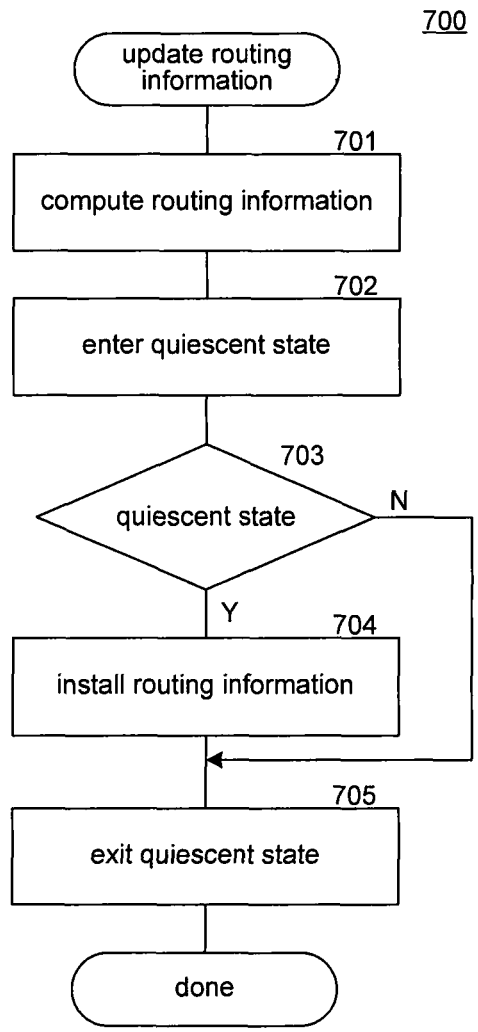
FIG. 7 is a flow diagram that illustrates overall processing of a dynamic update routing information component of the supervisory controller of the network resiliency system in some embodiments.

FIG. 7 is a flow diagram that illustrates overall processing of a dynamic update routing information component of the supervisory controller of the network resiliency system in some embodiments. The component 700 controls the computing of routing information based on changes to the configuration of the network (e.g., link errors or links added or removed), quiesces the network interconnect, installs the new routing information onto the network interconnect, and then unquiesces the network interconnect. In block 701, the component computes new routing information based on changes to the configuration of the network interconnect. In block 702, the component causes the network interconnect to enter a quiescent state. In decision block 703, if the network interconnect has entered the quiescent state (e.g., after waiting a quiescent period), then the component continues at block 704, else the component continues at block 705. In some embodiments, the component may compute the new routing information and quiesce the network interconnect in parallel by not waiting for the new routing information to be computed before starting the process of entering the quiescent state. In block 704, the component installs the new routing information onto the network interconnect. In block 705, the component causes the network interconnect to exit the quiescent state and then completes.

Figure 8:
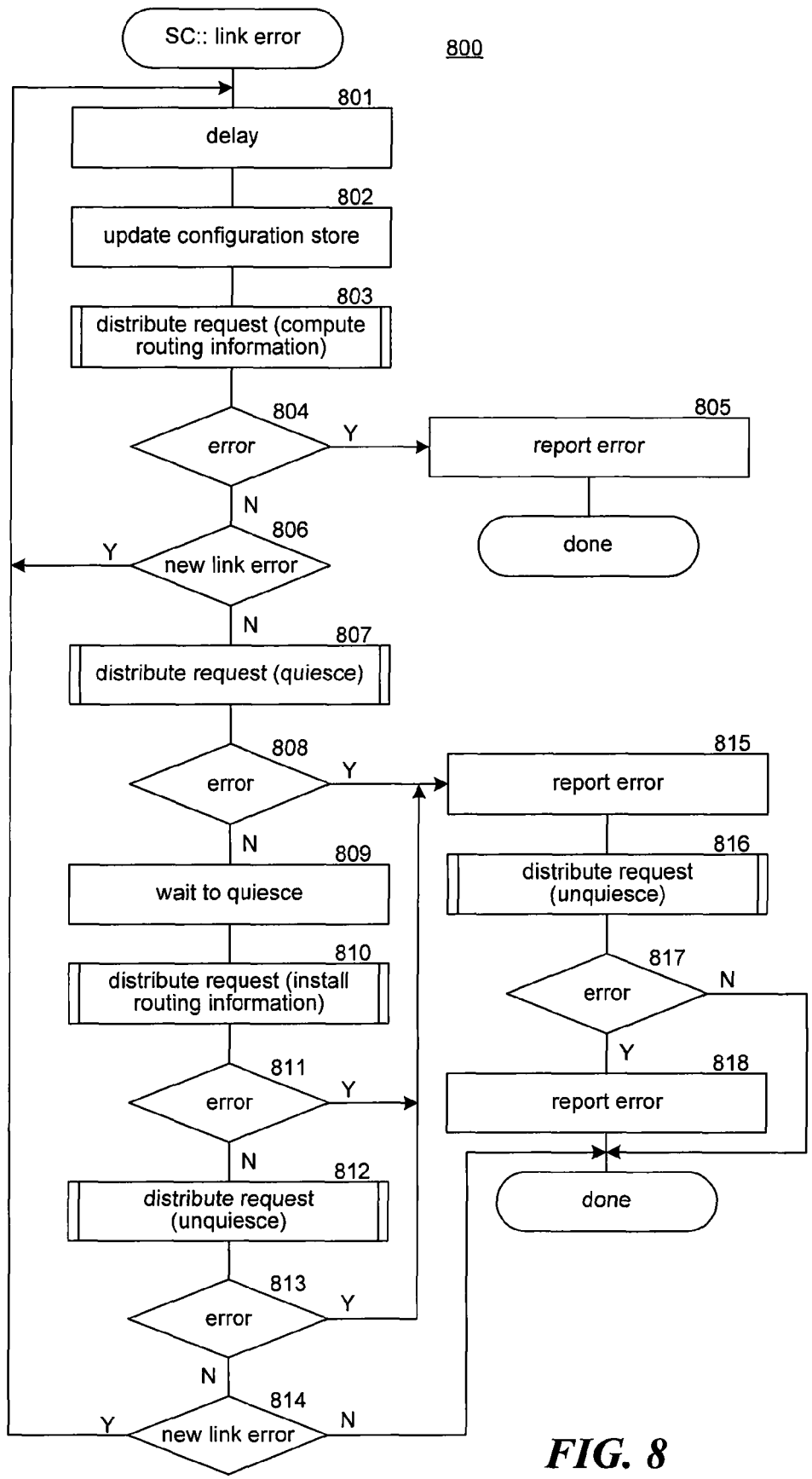
FIG. 8 is a flow diagram that illustrates detailed processing of the link error component of the supervisory controller of the network resiliency system in some embodiments.

FIG. 8 is a flow diagram that illustrates detailed processing of the link error component of the supervisory controller of the network resiliency system in some embodiments. The link error component 800 is invoked when an error in the network interconnect is reported by a local controller. In block 801, the component delays for a certain period to see if other link errors are reported. In block 802, the component updates the configuration information of the central store to reflect the changes resulting from the error. In some embodiments, the configuration information may be initially generated based on initial discovery of the links between routers as reported by the local controllers when the network is initialized. In block 803, the component invokes the distribute request component to distribute a compute routing information request to the local controllers. In decision block 804, if there was an error in the computing of the new routing information, then the component reports an error in block 805 and completes, else the component continues at block 806. In decision block 806, if there was an additional link error during the computing of the new routing information, then the component reports the error and loops to block 801 to restart the processing, else the component continues at block 807. In block 807, the component invokes the distribute request component to distribute a quiesce request to the local controllers. In decision block 808, if there is an error in distribution of the request, then the component continues at block 815, else the component continues at block 809. In block 809, the component waits for the network interconnect to quiesce. In block 810, the component invokes the distribute request component to distribute an install routing information request to each local controller. In decision block 811, if there is an error in distributing the request, then the component continues at block 815, else the component continues at block 812. In block 812, the component invokes the distribute request component to distribute an unquiesce request to the local controllers. In decision block 813, if there is an error in distributing the request, then the component continues at block 815, else the component continues at block 814. In decision block 814, if there was additional link error after the computing of the new routing information, then the component reports the error and loops to block 801 to restart the processing, else the component completes. In block 815, the component reports an error. In block 816, the component invokes the distribute request component to distribute an unquiesce request to the local controllers. In decision block 817, if there is an error in distributing the request, then the component reports the error in block 818. The component then completes.

Figure 9:
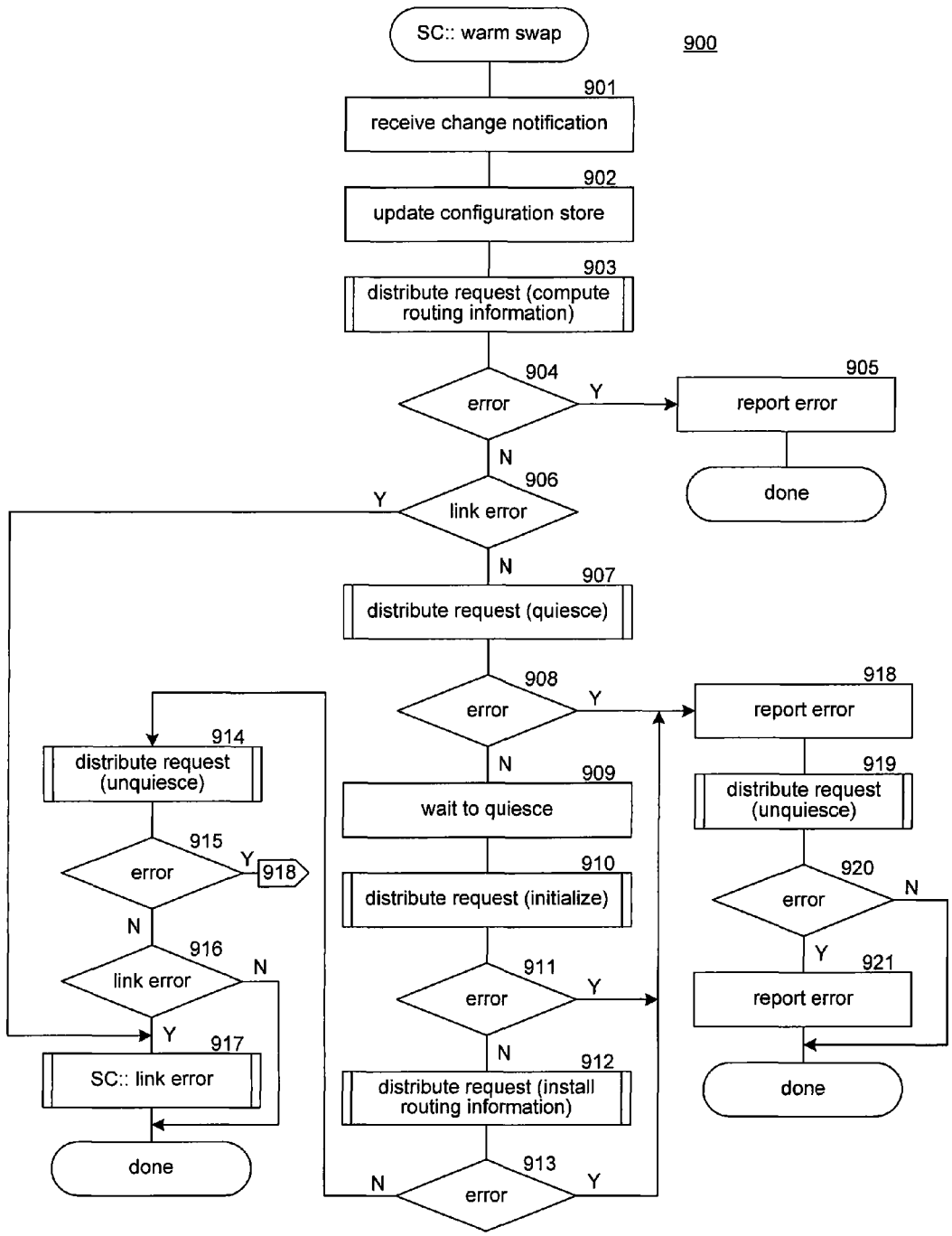
FIG. 9 is a flow diagram that illustrates detailed processing of a warm swap component of the supervisory controller of the network resiliency system in some embodiments.

FIG. 9 is a flow diagram that illustrates detailed processing of a warm swap component of the supervisory controller of the network resiliency system in some embodiments. The warm swap component 900 is invoked when a user indicates a planned change to the configuration. In block 901, the component receives the notification of the changes to the configuration. In block 902, the component updates the configuration information of the central store to reflect the changes to the configuration. In block 903, the component invokes the distribute request component to distribute a compute routing information request to the local controllers. In decision block 904, if there was an error in the computing of the new routing information, then the component reports an error in block 905 and completes, else the component continues at block 906. In decision block 906, if there was a link error during the computing of the new routing information, then the component reports the error, invokes the link error component of the supervisory controller in block 917 to restart the processing factoring in the link error, and then completes, else the component continues at block 907. In block 907, the component invokes the distribute request component to distribute a quiesce request to the local controllers. In decision block 908, if there is an error in distribution of the request, then the component continues at block 918, else the component continues at block 909. In block 909, the component waits for the network interconnect to quiesce. In block 910, the component invokes the distribute request component to distribute an initialize request to each local controller to initialize any new links. In decision block 911, if there is an error in distributing the request, then the component continues at block 918, else the component continues at block 912. In block 912, the component invokes the distribute request component to distribute an install routing information request to each local controller. In decision block 913, if there is an error in distributing the request, then the component continues at block 918, else the component continues at block 914. In block 914, the component invokes the distribute request component to distribute an unquiesce request to the local controllers. In decision block 915, if there is an error in distributing the request, then the component continues at block 918, else the component continues at block 916. In decision block 916, if there was a link error after the computing of the new routing information, then the component reports the error and invokes the link error component of the supervisory controller in block 917 to restart the processing factoring in the link error. The component then completes. In block 918, the component reports an error. In block 919, the component invokes the distribute request component to distribute an unquiesce request to the local controllers. In decision block 920, if there is an error in distributing the request, then the component reports the error in block 921. The component then completes.

Figure 10:
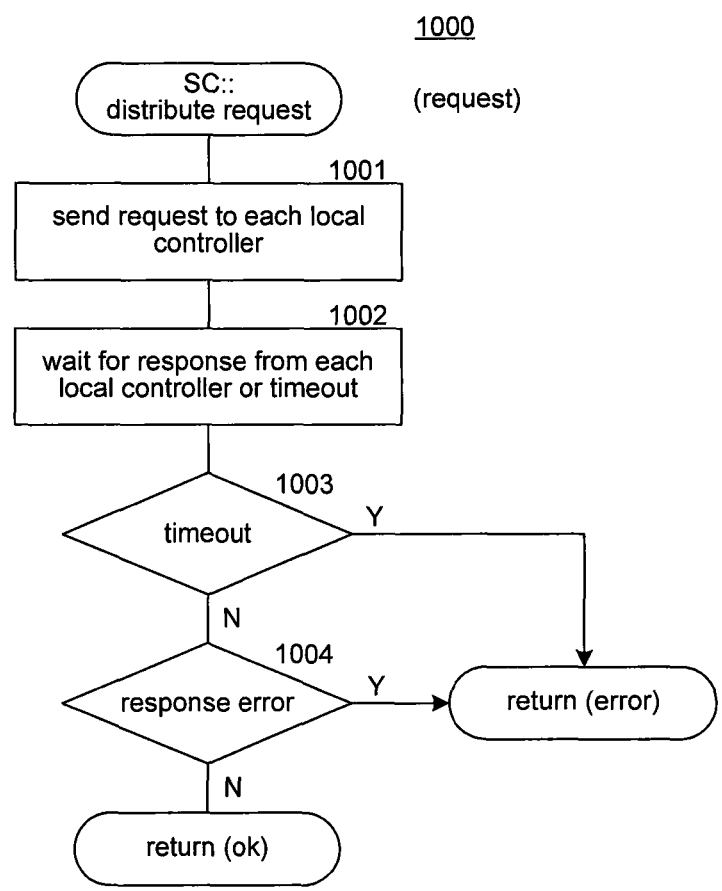
FIG. 10 is a flow diagram that illustrates the processing of the distribute request component of the supervisory controller of the network resiliency system in some embodiments.

FIG. 10 is a flow diagram that illustrates the processing of the distribute request component of the supervisory controller of the network resiliency system in some embodiments. The distribute request component 1000 is passed an indication of the request and distributes the request to the local controllers. In block 1001, the component sends a request to each local controller. In block 1002, the component waits for each controller to send a response. In decision block 1003, if the local controllers do not respond within a timeout period, then the component returns an error, else the component continues at block 1004. In decision block 1004, if the response indicates an error, then the component returns an error, else the component returns an indication of success.

Figure 11:
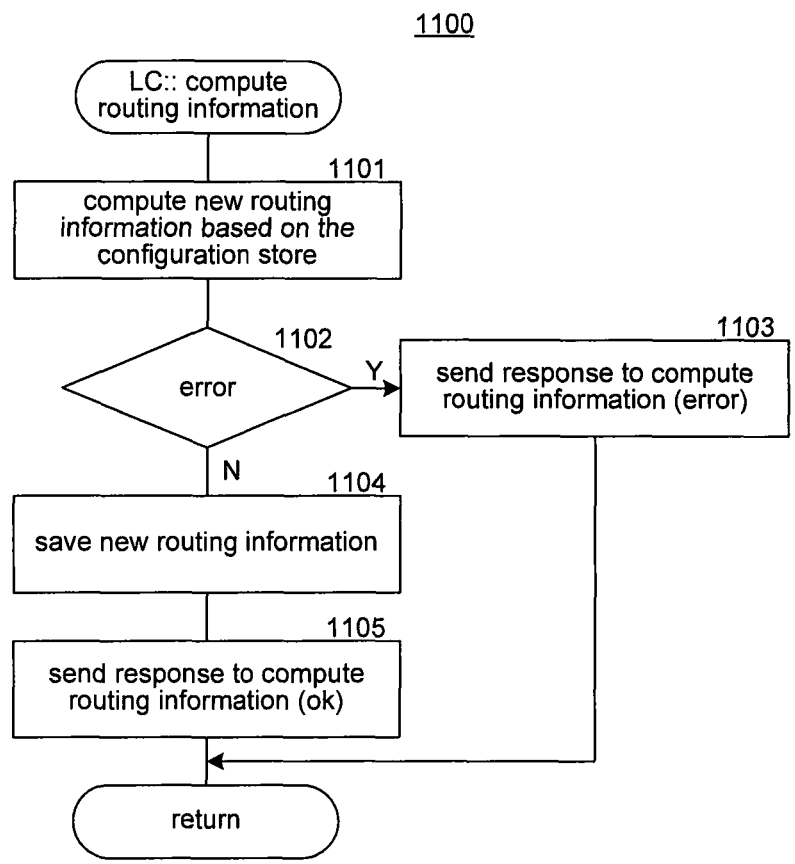
FIG. 11 is a flow diagram that illustrates the processing of a compute routing information component of the local controller of the network resiliency system in some embodiments.

FIG. 11 is a flow diagram that illustrates the processing of a compute routing information component of the local controller of the network resiliency system in some embodiments. The compute routing information component 1100 is invoked when a local controller receives a request from a supervisory controller to compute routing information. In block 1101, the component computes the new routing information based on the configuration information. In decision block 1102, if there is an error in the computing of the new routing information, then the component continues at block 1103, else the component continues at block 1104. In block 1103, the component sends a response to the compute routing information request indicating an error and then returns. In block 1104, the component saves the new routing information locally. In block 1105, the component sends a response to the compute routing information request indicating success and then returns.

Figure 12:
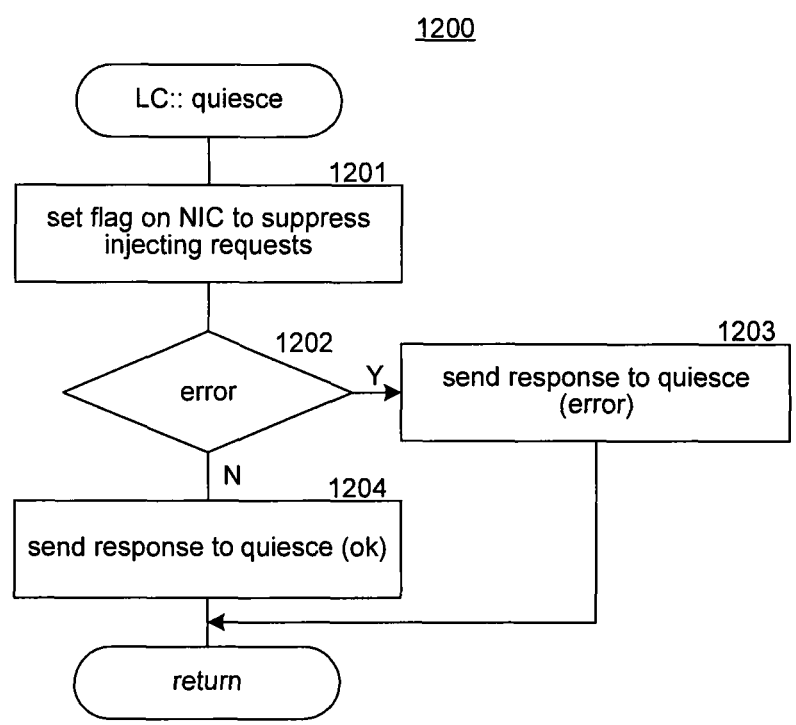
FIG. 12 is a flow diagram that illustrates the processing of the quiesce component of the local controller of the network resiliency system in some embodiments.

FIG. 12 is a flow diagram that illustrates the processing of the quiesce component of the local controller of the network resiliency system in some embodiments. The quiesce component 1200 is invoked when a quiesce request is received from the supervisory controller. In block 1201, the component sets a flag of the network interface controller to suppress the injecting of requests into the network interconnect. In decision block 1202, if there is an error in suppressing the injecting, then the component continues at block 1203, else the component continues at block 1204. In block 1203, the component sends a response to the quiesce request indicating an error and then returns. In block 1204, the component sends a response to the quiesce request indicating success and then returns.

Figure 13:
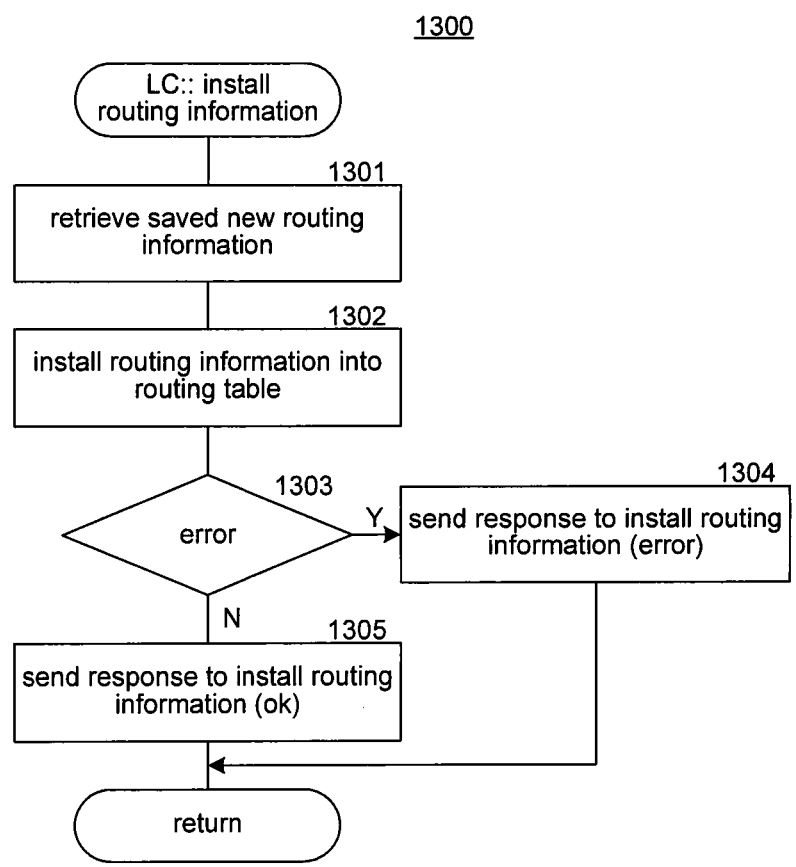
FIG. 13 is a flow diagram that illustrates the processing of the install routing information component of the local controller of the network resiliency system in some embodiments.

FIG. 13 is a flow diagram that illustrates the processing of the install routing information component of the local controller of the network resiliency system in some embodiments. The install routing information component 1300 is invoked when the local controller receives an install routing information request from the supervisory controller. In block 1301, the component retrieves the saved new routing information. In block 1302, the component directs the installing of the routing information into the routing tables of routers. In decision block 1303, if there was an error in installing the routing information, then the component continues at block 1304, else the component continues at block 1305. In block 1304, the component sends a response to the install routing information request indicating an error and then returns. In block 1305, the component sends a response to the install routing information request indicating success and then returns.

Figure 14:
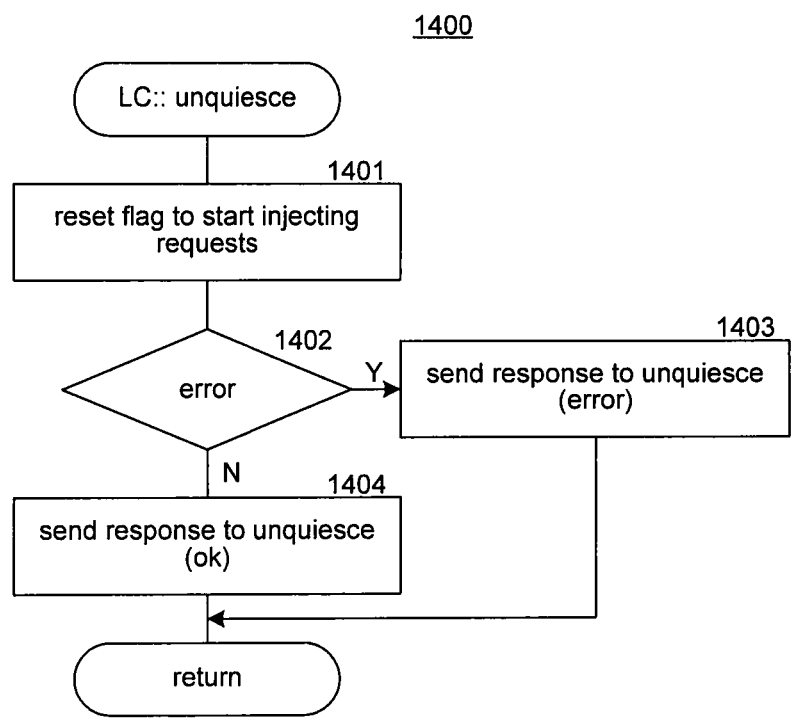
FIG. 14 is a flow diagram that illustrates the processing of the unquiesce component of the local controller of the network resiliency system in some embodiments.

FIG. 14 is a flow diagram that illustrates the processing of the unquiesce component of the local controller of the network resiliency system in some embodiments. The unquiesce component 1400 is invoked when a controller receives an unquiesce request from the supervisory controller. In block 1401, the component resets a flag to start injecting request packets into the network interconnect. In decision block 1402, if there is an error in resetting the flag, then the component continues at block 1403, else the component continues at block 1404. In block 1403, the component sends a response to the unquiesce request indicating an error and then returns. In block 1404, the component sends a response to the unquiesce request indicating success and then returns.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. The connection devices may include routers, switches, network switches, switching hubs, switching devices, routing devices, network routers, packet switches, connectors, sub-components of such connection devices, and so on. The components of a network may be connected via wired or wireless connections. Although the data routed through the network is described as being organized as packets with flits, the data may be organized in other ways (e.g., packets without any subdivision into flits, packets with a fixed number of sub-packets or flits, or fixed-sized packets). Accordingly, the invention is not limited except as by the appended claims.

We claim:

1. A method for recovering from a failure in a network interconnect having processors connected via routers, the method comprising:
    upon detecting a failure,
        requesting a compute routing information component to compute new routing information for the network interconnect;
        requesting a quiesce component to suppress the injecting of request packets into the network interconnect while allowing response packets to be injected into the network interconnect and in-transit request packets to continue through the network interconnect; and
    after the injection of request packets is suppressed,
        waiting for the network interconnect to enter a quiescent state in which neither request packets nor response packets are in transit through the network interconnect; and
    after the network interconnect enters the quiescent state,
        requesting an install routing information component to install the new routing information into the network interconnect; and
        after the new routing information is installed into the network interconnect, requesting an unquiesce component to allow the injecting of request packets into the network interconnect
wherein each processor is connected to a router through a network interface controller, each processor is connected to a local controller through a network that is out-of-band from the network interconnect, and the suppressing of the injecting of request packets includes the local controller notifying a program executing on the processor to not send requests for injection of request packets into the network interconnect.

2. The method of claim 1 wherein programs executing on the processors connected to the network interconnect continue to execute after injecting of request packets is suppressed to the extent that the suppressing does not interfere with execution of those programs.

3. The method of claim 1 wherein computing of the new routing information is distributed across the local controllers.

4. The method of claim 3 wherein the installing of the new routing information into the network interconnect includes distributing via the out-of-band network a request to use the new routing information to each local controller and waiting for a response to the request from each local controller.

5. A method for recovering from a failure in a network interconnect having processors connected via routers, the method comprising:
    upon detecting a failure,
        requesting a compute routing information component to compute new routing information for the network interconnect;
        requesting a quiesce component to suppress the injecting of request packets into the network interconnect while allowing response packets to be injected into the network interconnect and in-transit request packets to continue through the network interconnect; and
    after the injection of request packets is suppressed,
        waiting for the network interconnect to enter a quiescent state in which neither request packets nor response packets are in transit through the network interconnect; and
    after the network interconnect enters the quiescent state,
        requesting an install routing information component to install the new routing information into the network interconnect; and
        after the new routing information is installed into the network interconnect, requesting an unquiesce component to allow the injecting of request packets into the network interconnect
wherein the waiting for the network interconnect to enter a quiescent state includes waiting for a timeout that is based on a maximum time for a request packet and a response packet to that request packet to transit through the network interconnect.

6. The method of claim 5 wherein a processor is connected to a router through a network interface controller, the processor is connected to a local controller through a network that is out-of-band from the network interconnect, and the suppressing of the injecting of request packets includes the local controller requesting the network interface controller to not send request packets to the router.

7. The method of claim 6 wherein a program executing on the processor detects a buffer full condition that prevents the program from sending requests for injecting request packets onto the network interconnect.

8. A computer-readable memory containing computer-executable instructions for recovering from a failure in a network interconnect having processors connected via routers, the routers being connected via links, by a method comprising:
    providing new routing information for the network interconnect based on configuration of the network interconnect after the failure;
    requesting a quiesce component to suppress the injecting of request packets into the network interconnect; and after the injection of request packets is suppressed and after the network interconnect has entered a quiescent state, requesting an install routing information component to install the new routing information into the network interconnect; and
after the new routing information is installed into the network interconnect, requesting an unquiesce component to allow the injecting of request packets into the network interconnect
wherein each processor is connected to a router through a network interface controller, each processor is connected to a local controller through a network that is out-of-band from the network interconnect, and the suppressing of the injecting of request packets includes the local controller requesting the network interface controller to not send request packets to the router.

9. The computer-readable memory of claim 8 wherein the quiescent state is entered when no packets are in transit in the network interconnect.

10. The computer-readable memory of claim 8 wherein programs executing on the processors continue to execute after injecting of request packets is suppressed to the extent that the suppressing does not interfere with execution of those programs.

11. A computer-readable memory containing computer-executable instructions for recovering from a failure in a network interconnect having processors connected via routers, the routers being connected via links, by a method comprising:
providing new routing information for the network interconnect based on configuration of the network interconnect after the failure;
requesting a quiesce component to suppress the injecting of request packets into the network interconnect; and
after requesting the suppressing of the injecting of request packets, waiting for the network interconnect to enter a quiescent state for a timeout period that is based on a maximum time for a request packet and a response packet to that request packet to transit through the network interconnect;
after the injection of request packets is suppressed and after the network interconnect has entered a quiescent state, requesting an install routing information component to install the new routing information into the network interconnect; and
after the new routing information is installed into the network interconnect, requesting an unquiesce component to allow the injecting of request packets into the network interconnect.

12. A system for adapting routing in a network interconnect to a changed configuration, comprising:
processors connected to routers of the network interconnect via network interconnect controllers;
local controllers that are each connected to a network interconnect and that, in response to receiving a request to quiesce, suppress the injection of request packets by the network interface controller into the interconnection network, in response to receiving a request to unquiesce, allow the injection of request packets by the network interface controller into the interconnection network, and in response to receiving a request to install routing information, provide the routing information for installation into the routers; and
a supervisory controller that is connected to the local controllers via a network that is out-of-band from the network interconnect, the supervisory controller for sending a request to each local controller to quiesce, sending a request to each local controller to install new routing information, and after the new routing information is installed in the routers, sending a request to each local controller to unquiesce;
wherein each processor has an operating system that creates processes for application and the created processes do not terminate as a result of the suppressing of the injection of request packets into the network interconnect.

13. A system for adapting routing in a network interconnect to a changed configuration, comprising:
processors connected to routers of the network interconnect via network interconnect controllers;
local controllers that are each connected to a network interconnect and that, in response to receiving a request to quiesce, suppress the injection of request packets by the network interface controller into the interconnection network, in response to receiving a request to unquiesce, allow the injection of request packets by the network interface controller into the interconnection network, and in response to receiving a request to install routing information, provide the routing information for installation into the routers; and
a supervisory controller that is connected to the local controllers via a network that is out-of-band from the network interconnect, the supervisory controller for sending a request to each local controller to quiesce, sending a request to each local controller to install new routing information, and after the new routing information is installed in the routers, sending a request to each local controller to unquiesce;
wherein the supervisory controller determines that the network interconnect is in a quiescent state by waiting for a timeout period that is based on a maximum time for a request packet and a response packet to that request packet to transit through the network interconnect.

14. The system of claim 13 wherein a quiescent state is entered when no packets are in transit in the network interconnect.

15. The system of claim 13 wherein when the local controllers receive a request to quiesce, the local controllers request a network interface controller to not allow any request packets to be injected into the network interconnect.

16. The system of claim 15 wherein the network interface controller allows response packets to be injected into the interconnect network and already-injected request packets are allowed to continue in transit.

* * * * *